United States Patent Office 3,487,043
Patented Dec. 30, 1969

3,487,043
FURANE RESINS WITH SILANE COUPLING AGENTS
Gabriel M. Grudus, Jr., Dover, N.J., assignor to Interpace Corporation, a corporation of Delaware
No Drawing. Filed Dec. 23, 1966, Ser. No. 604,189
Int. Cl. C08f 31/04; C08g 47/10
U.S. Cl. 260—41                                13 Claims

ABSTRACT OF THE DISCLOSURE

Relates to a composition containing an in situ polymerized liquid furan resin, an insoluble filler material, acid catalyst and a silane having the formula

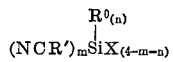

wherein $R^0$ represents a hydrogen, a hydrocarbyl group or an aryl group, X is a hydrolyzable group, R' is an alkylene or arylene radical containing 2 to 8 carbon atoms, m is a whole number having a value of from 1 to 3 and n is a whole number having a value of from 0 to 2 with the sum of m and n being not greater than 3.

---

The present invention concerns a process for improving the flexural strength of reinforced furan resin compositions, improved reinforced furan resin compositions and composite articles of a reinforced furan resin. More particularly, the invention is concerned with a novel silane modified reinforced furan resin composition.

Reinforced furan resins are widely used for producing composite articles such as self-supporting furan pipes, ducts, tanks and the like, fiberglass and other filler material being used in the art to reinforce the furan resin. The known reinforced furan resin compositions however have generated problems. Thus while the filler contributes strength and impact resistance to the resin compositions, the heretofore filler-furan resin compositions have relatively low water resistance, the bond between the filler and the furan resin being insufficient to prevent rupture when contacted with fluids especially aqueous media. Also the strength of composite articles made from known filler-furan resin compositions can be much less in the dry state than should be the case if proper adhesion of filler and furan resin was obtained. The result is to limit the utility of the composite article.

It is an object of the present invention to provide a novel thermoset laminate.

It is also an object of the present invention to provide a novel process for preparing a reinforced furan resin composition.

Yet another object of the present invention is to provide a novel filler reinforced furan resin composition.

It is a further object of the present invention to provide composite articles and a method of making composite articles comprising a furan resin reinforced with a filler material.

It is another object of the present invention to provide silane-furan resin mixtures of unusual long shelf life.

Other objects of the present invention will be apparent to those skilled in the art from the following description and examples.

I have found that the foregoing objectives can be obtained with a cured mixture of a liquid furan resin, an organocyano silane, a conventional acid polymerization catalyst and a filler material.

The novelty of my invention lies chiefly in the use of a specific organosilane. This silane can be graphically depicted by the following formula:

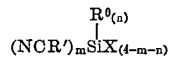

wherein $R^0$ represents a hydrogen atom or a hydrocarbyl group, preferably a saturated aliphatic hydrocarbyl group as for example an alkyl group, such as methyl, ethyl, propyl, butyl, pentyl and the like or a cycloalkyl group such as cyclopentyl, cyclohexyl, ethylcyclohexyl, and the like or an aryl group such as tolyl and the like, X is a hydrolyzable group such as a halogen atom or preferably a hydrocarbyloxy group, preferably an alkoxy group such as methoxy, ethoxy and the like, R' is an alkylene or arylene radical containing 2 to 8 carbon atoms, the cyano group being attached to any carbon atom of the alkylene or arylene radical, m is a whole number having a value of from 1 to 3 and n is a whole number having a value of from 0 to 2 with the sum of m and n being not greater than 3.

Exemplary silanes include beta-cyanoethyltriethoxysilane and beta-cyanoethylmethyldiethoxysilane. Beta-cyanoethyltriethoxysilane has been found particularly advantageous in the present invention.

The foregoing cyanoalkyl silanes, in an integral blend of filler and furan resin, are effective in reducing losses in flexural strength of filler reinforced furan resins to about 11-31 percent of the original strength after prolonged exposure to boiling water. This was unexpected and unpredictable on the basis of current theories of the effectiveness of silanes for particular resin systems.

In my compositions a wide variety of liquid furan resins can be employed. These resins generally have a viscosity of about 50 to 100,000 cps. at 23° C. and can be synthesized from furfuryl alcohol. They are also commercially available, for example, Durez 16470.[1]

Also although the liquid furan resins are those preferably prepared from the sole condensation of furfuryl alcohol, it is not intended that the term "liquid furan resin" as used herein be so restricted. Thus, for example, other furan resins, including resins of furfuryl alcohol and furfural; of furfuryl alcohol, furfural and formaldehyde; of furfuryl alcohol and formaldehyde; and of furfuryl alcohol, formaldehyde and phenol are applicable. Moreover, any of the above furan resins can be used in admixture with other resins, for example, polyvinyl butyral, partially hydrolyzed polyvinyl acetate and a liquid phenolic resin. Also solid furan resins, the term "solid" denoting a resin with a softening point above room temperature, but which can be liquified by the addition of about 1 to 25 percent of an organic solvent, are included in the term "liquid furan resin."

It is preferred that the liquid furan resin contain no solvents aside from unpolymerized furfuryl alcohol, furfural and/or a minimum amount of water, i.e. about 0.01 to 1 percent by weight. Resins containing about 1 to 25 percent by weight of furfuryl alcohol and about 1 to 25 percent by weight of furfural are operable.

The acid polymerization catalyst, otherwise termed curing agent, curing accelerator or curing catalyst, includes ---
[1] Durez 16470 available at Hooker Chemical Company. Durez Plastics Division, North Tonawanda, N.Y. is a liquid furan resin containing approximately 7% by weight free furfuryl alcohol and about 15% by weight free furfural and has a specific gravity of 1.21. Hooker reports that the liquid furan resin has a viscosity of 200 cps. at 25° C. and a pH of 4.5.

mineral acids, for example, sulfuric, phosphoric, nitric and hydrochloric acids; organic acids for example, p-toluenesulfonic acid, benzene sulfonic acid, oxalic acid, maleic acid and phthalic acid as well as their anhydrides; inorganic salts, for example, aluminum chloride, ferric chloride, boron trifluoride and the like; and mixtures of one or more of the foregoing with or without alkyl-, aryl- and alkanol amines and/or amides. A liquid acid catalyst is generally preferred since it can easily be dispersed throughout the liquid resin.

A wide variety of water insoluble filler material can be used in my invention. Applicable filler material includes fiberglass, titania, ceramic fibers or powders, carbon black, silica, alumina, silica flour, asbestos, clays, and the like. Fiber glass has been found to be particularly suitable in my invention. The form of the filler is not critical. Thus the fiber glass may be in the form of a chopped strand mat. It could also be in the form of cloth, woven or continuous roving fibers, loose chopped fibers or milled fibers.

It is also within the scope of my invention to include in my compositions other components which do not affect the characteristics of the reinforced furan resin. These components include dyes, stabilizers, surfactants, and the like.

In forming my novel compositions, 0.01 to 10 parts, preferably 0.5 to 2.0 parts, by weight of the silane, is mixed with 100 parts by weight of the liquid furan resin. The mixture is then stirred to assure complete solution of the silane in the resin. Unexpectedly it was found that my silane-furan resin solutions have a long shelf life.

Then 0.5 to 10 parts, preferably 1 to 3 parts, by weight of the acid catalyst is added with stirring to the silane-furan resin solution. After the acid catalyst is completely dispersed in the silane-furan resin solution, 5 to 90 parts, preferably 20 to 30 parts, by weight of a filler and/or reinforcing material is impregnated with the catalyzed silane-furan resin solution.

If desired, the filler and/or reinforcing material can be treated directly with the silane and the filler material thereupon treated with a catalyzed furan resin dispersion.

Laminates can be prepared by laying up the treated filler, in accordance with customary practices, and conventionaly cured.

The exact amount of filler material used in my composition is dependent on the particular type of reinforcment desired, the use to which the composite article is put, and the ease with which a particular form of filler can be impregnated. The blend of silane, furan resin, filler and catalyst may be cured at conventional curing temperatures, e.g. 24 hours at room temperature followed by 24 hours at 40 to 45° C. and 24 hours at 70° C. The particular curing temperature, however, is not critical to my invention.

The following examples are given to aid in understanding my invention but it is to be understood that the invention is not restricted to the specific compositions or conditions of application given in the examples. Said examples are rather only illustrative and should not be construed as limiting the invention which is properly delineated in the appended claims.

EXAMPLE 1

To each of 100 parts by weight of a liquid furan resin synthesized from furfuryl alcohol and having a viscosity of 700 cps. at 23° C., a furfuryl alcohol content about 12 percent by weight and a pH of about 4.5, the respective silane in the Table I was added and the mixture stirred for about 5 minutes to assure complete solution of the silane in the furan resin. Then about 1.8 parts by weight, per 100 parts by weight of the furan resin, of an acid catalyst, specifically a mixture of para-toluene sulfonic acid in concentrated phosphoric acid in the ratio of 30:70 parts by weight, was added to the silane-furan resin mixture with stirring. After the acid catalyst was completely dispersed in the silane-furan resin mixture, 25 parts by weight of fiberglass, in the form of chopped strand mat, was impregnated with 75 parts by weight of the silane-furan resin mixture. A furan resin FRP (fiber glass reinforced plastic) laminate was prepared by laying up two layers of the impregnated mat and curing the laminate to a minimum Barcol (Model GYZJ 934–1) hardness of 38. The curing schedule used was as follows: 24 hours at room temperature, 24 hours at 40 to 45° C. and 24 hours at 70° C.

The flexural strength and percent flexural strength retention of the runs are shown in following Table I. The flexural strength retentions in Table I of the compositions of runs 10 and 11, which are according to the present invention, were completely unexpected.

TABLE I

| Run | | Level used, pts./100 pts. resin | Dry flexural strength, p.s.i. | Wet flexural strength, p.s.i.* | Percent flexural strength retention |
|---|---|---|---|---|---|
| 1 | None (control) | | 21,600 | 9,950 | 46 |
| 2 | Phenyltriethoxysilane | 1.0 | 23,500 | 8,700 | 37 |
| 3 | Beta-3,4(epoxycyclohexyl)ethyltrimethoxysilane | 1.0 | 17,700 | 7,700 | 44 |
| 4 | Vinyltriethoxysilane | 1.0 | 21,000 | 9,900 | 47 |
| 5 | Acrylato tris methoxy silane | 1.0 | 18,200 | 9,100 | 49 |
| 6 | Gamma-chloropropyltrimethoxysilane | 1.0 | 20,100 | 10,100 | 50 |
| 7 | γ-Aminopropyltriethoxysilane | 1.0 | 14,000 | 8,100 | 58 |
| 8 | γ-Glycidoxy propyltrimethoxysilane | 1.0 | 19,800 | 13,150 | 66 |
| 9 | NN-bis (B-hydroxyethyl)-γ-aminopropyltriethoxysilane | 1.0 | 24,900 | 10,700 | 43 |
| 10 | Beta-cyanoethyltriethoxysilane | 1.0 | 22,000 | 17,450 | 80 |
| 11 | do | 0.5 | 23,800 | 18,150 | 76 |

*The dry flexural strength in this example and the following examples was determined according to ASTM D–790 (Procedure A, Table I); the wet flexural strength was determined according to ASTM D–790 (Procedure A, Table I) with a modification that the samples were tested two hours after removal from a seven-day exposure to a boiling water bath.

EXAMPLE II

Two solutions (for Runs 12 and 13 in Table II) of beta-cyanoethyltriethoxysilane and furan resin were prepared in the manner described in Example I, Run 10, with the exception that no catalyst was added. The solutions were stored in metal cans at room temperature. At the end of 14 and 30 days the solutions of the silane-furan resin were catalyzed as in Example I, Run 10, and fiber glass laminates prepared as in Example I. These laminates were cured as in Example I and their flexural strength determined. The results are given in Table II.

TABLE II

| Run | Age, days | Dry flexural strength, p.s.i. | Wet flexural strength, p.s.i. | Percent retention |
|---|---|---|---|---|
| 12 | 14 | 16,600 | 14,600 | 88 |
| 13 | 30 | 21,000 | 19,200 | 82 |

These results establish the unexpected shelf life of my silane-furan resin dispersions.

EXAMPLE III

Two solutions (for Runs 14 and 15 of Table III) of beta-cyanoethyltriethoxysilane and furan resin were prepared in the manner described in Example I, Run 10, with the modification that Durez 16470 was used as the furan resin and no catalyst was added. The solutions were stored in metal cans at room temperature. At the end of 14 and 30 days the solutions of the silane-furan resin were catalyzed as in Example I, Run 10, and fiberglass laminates prepared as in Example I. The laminates were so obtained and cured as in Example I and tested for their flexual strength.

TABLE III

| Run | Age, days | Dry flexural strength, p.s.i. | Wet flexural strength, p.s.i. | Percent retention |
|---|---|---|---|---|
| 14 | 14 | 17,400 | 15,500 | 89 |
| 15 | 30 | 20,000 | 17,700 | 89 |

These results confirm the results of Example II.

For brevity, various features have been illustrated and described in connection with a limited number of illustrative embodiments. It is intended that these features be used also in combination with features shown in other embodiments without departing from the spirit of the invention.

The terms and expressions that have been employed in the specification are used as terms of description and not of limitation, and there is no intention, in the use of such terms and expressions of excluding any equivalents of the features shown and described or portions thereof, since it is recognized that various modifications are possible within the scope of the invention claimed.

What is claimed is:

1. A composite article comprising an in situ polymerized solid polymer of a composition containing a liquid furan resin, a water insoluble filler material, an acid catalyst and 0.01 to 10 parts by weight per 100 parts by weight of the liquid furan resin, of a silane having the following formula:

$$(NCR')_m\overset{R^0_{(n)}}{\underset{|}{Si}}X_{(4-m-n)}$$

wherein $R^0$ represents a hydrogen atom, hydrocarbyl group, or an aryl group, X is a halogen or hydrocarbyloxy group, R' is an alkylene or arylene radical containing 2 to 8 carbon atoms, the cyano group being attached to any carbon atom of the alkylene or arylene radical, m is a whole number having a value of from 1 to 3 and n is a whole number having a value of from 0 to 2 with the sum of m and n being not greater than 3.

2. A process for preparing a composite article which comprises mixing together a liquid furan resin, a water insoluble filler material, an acid catalyst and 0.01 to 10 parts by weight per 100 parts by weight of the liquid furan resin, of a silane having the following formula:

$$(NCR')_m\overset{R^0_{(n)}}{\underset{|}{Si}}X_{(4-m-n)}$$

wherein $R^0$ represents a hydrogen atom, hydrocarbyl group, or an aryl group, X is a halogen or hydrocarbyloxy group, R' is an alkylene or arylene radical containing 2 to 8 carbon atoms, the cyano group being attached to any carbon atom of the alkylene or arylene radical, m is a whole number having a value of from 1 to 3 and n is a whole number having a value of from 0 to 2 with the sum of m and n being not greater than 3.

3. A reinforced furan resin composition comprising an in situ polymerized solid polymer of a composition containing a liquid furan resin, a water insoluble filler material, an acid catalyst and 0.01 to 10 parts by weight per 100 parts by weight of the liquid furan resin, of a silane having the following formula:

$$(NCR')_m\overset{R^0_{(n)}}{\underset{|}{Si}}X_{(4-m-n)}$$

wherein $R^0$ represents a hydrogen atom, hydrocarbyl group, or an aryl group, X is a halogen or hydrocarbyloxy group, R' is an alkylene or arylene radical containing 2 to 8 carbon atoms, the cyano group being attached to any carbon atom of the alkylene or arylene radical, m is a whole number having a value of from 1 to 3, and n is a whole number having a value of from 0 to 2 with the sum of m and n being not greater than 3.

4. A reinforced furan resin composition according to claim 3 wherein the filler material is fiber glass and the silane is beta-cyanoethyltriethoxysilane.

5. A reinforced furan resin composition according to claim 3 wherein the filler material is silica and the silane is beta-cyanoethyltriethoxysilane.

6. A process according to claim 2 wherein the filler material is fiber glass and the silane is beta-cyanoethyltriethoxysilane.

7. A process according to claim 2 wherein the filler material is silica and the silane is beta-cyanoethyltriethoxysilane.

8. A reinforced furan resin composition according to claim 3 wherein the filler material is fiberglass and the silane is beta-cyanoethylmethyldiethoxysilane.

9. A process according to claim 2 wherein the filler material is fiberglass and the silane is beta-cyanoethylmethyldiethoxysilane.

10. A reinforced furan resin plastic laminate comprising an in situ polymerized solid polymer of a composition containing a liquid furan resin, a water insoluble filler material, an acid catalyst and 0.01 to 10 parts by weight per 100 parts by weight of the liquid furan resin, of a silane having the following formula:

$$(NCR')_m\overset{R^0_{(n)}}{\underset{|}{Si}}X_{(4-m-n)}$$

wherein $R^0$ represents a hydrogen atom, hydrocarbyl group, or an aryl group, X is a halogen or hydrocarbyloxy group, R' is an alkylene or arylene radical containing 2 to 8 carbon atoms, the cyano group being attached to any carbon atom of the alkylene or arylene radical, m is a whole number having a value of from 1 to 3 and n is a whole number having a value of from 0 to 2 with the sum of m and n being not greater than 3.

11. A process for preparing a reinforced furan resin plastic laminate which comprises mixing together a liquid furan resin, an insoluble filler material, an acid catalyst and 0.01 to 10 parts by weight per 100 parts by weight of the liquid furan resin, of a silane having the following formula:

$$(NCR')_m\overset{R^0_{(n)}}{\underset{|}{Si}}X_{(4-m-n)}$$

wherein $R^0$ represents a hydrogen atom, hydrocarbyl group, or an aryl group, X is a halogen or hydrocarbyloxy group, R' is an alkylene or arylene radical containing 2 to 8 carbon atoms, the cyano group being attached to any carbon atom of the alkylene or arylene radical, m is a whole number having a value of from 1 to 3 and n is a whole number having a value of from 0 to 2 with the sum of m and n being not greater than 3, laying at least two layers of the mixture, and allowing the liquid furan resin to further polymerize.

12. A reinforced furan resin plastic laminate according to claim 10 wherein the filler material is fiberglass and the silane is beta-cyanoethyltriethoxysilane.

13. A filled furan resin composite comprising an in situ polymerized polymer of a composition containing a liquid furan resin, silica, an acid catalyst and 0.01 to 10 parts by weight per 100 parts by weight of the liquid furan resin, of beta-cyanoethyltriethoxysilane.

References Cited

UNITED STATES PATENTS 2,721,873  10/1955  MacKenzie et al.

(Other references on following page)

UNITED STATES PATENTS 2,768,408 10/1956 Strigle et al. ____ 260—88.5 X
3,159,662 12/1964 Ashby.
3,220,970 11/1965 Carlstrom et al. _____ 260—37

OTHER REFERENCES

Sterman et al.; The Effect of Silane Coupling Agents In Improving The Properties of Filled or Reinforced Thermoplastics; 1965; 21st Annual Technical Conference, Society of Plastics Engineers, Inc.; pp. 1–14.

ALLAN LIEBERMAN, Primary Examiner

L. T. JACOBS, Assistant Examiner

U.S. Cl. X.R.

260—37, 88.5